No. 633,041.  
Patented Sept. 12, 1899.

J. REEL.
HARNESS.
(Application filed Mar. 31, 1898.)

(No Model.)

Witnesses  
J. Frank Culverwell,  
N. F. Riley

John Reel, Inventor.  
By his Attorneys,  
C. A. Snow & Co.

UNITED STATES PATENT OFFICE.

JOHN REEL, OF FRENCH CAMP, MISSISSIPPI.

HARNESS.

SPECIFICATION forming part of Letters Patent No. 633,041, dated September 12, 1899.

Application filed March 31, 1898. Serial No. 675,936. (No model.)

*To all whom it may concern:*

Be it known that I, JOHN REEL, a citizen of the United States, residing at French Camp, in the county of Choctaw and State of Mississippi, have invented a new and useful Horse-Detacher, of which the following is a specification.

The invention relates to improvements in horse-detachers.

The object of the present invention is to improve the construction of horse-detachers and to provide a simple and comparatively inexpensive device capable of enabling a horse to be readily disconnected from a vehicle in event of a runaway to prevent a vehicle or its occupants from being injured.

A further object of the invention is to simplify the harness and to facilitate harnessing and unharnessing a horse from a vehicle.

The invention consists in the construction and novel combination and arrangement of parts, as hereinafter fully described, illustrated in the accompanying drawings, and pointed out in the claims hereto appended.

Figure 1:
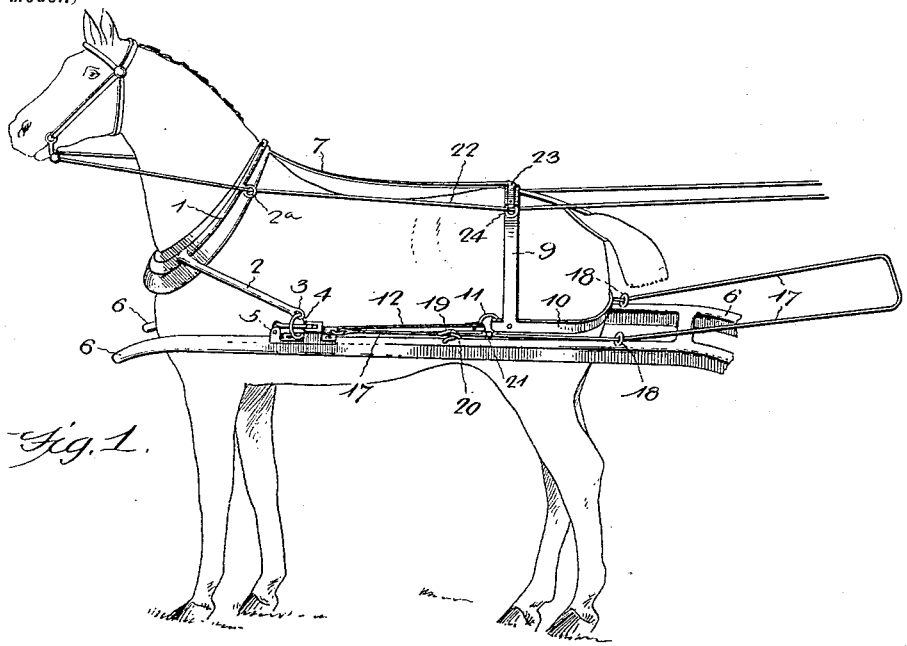
Figure 2:
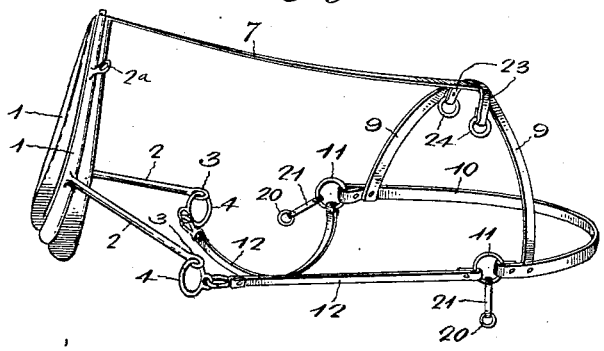
Figure 3:
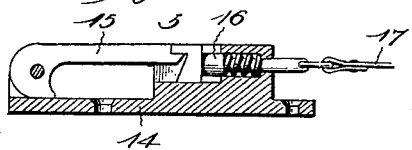

In the drawings, Figure 1 is a perspective view of a horse-detacher constructed in accordance with this invention and shown applied to a horse and a pair of thills. Fig. 2 is a perspective view of the harness detached. Fig. 3 is a longitudinal sectional view of one of the catches.

Like numerals of reference designate corresponding parts in all the figures of the drawings.

1 1 designate a pair of hames constructed of suitable metal and provided at opposite sides of a horse with rearwardly-extending arms 2, arranged between the upper and lower ends of the hames and extending downward at a slight angle, the rear ends of the hame-arms being provided with eyes 3, into which are linked rings 4, which engage catches 5 of a pair of thills 6. The arms 2, which are formed integral with the hames, serve to support the thills without necessitating the employment of a back-band or saddle, and the hames are provided at a point above the arms with eyes 2ª to receive the reins. The hames, which are arranged in the usual manner on a horse-collar, are connected at their upper ends with the strap 7, which extends along the back of the horse to the strap 9, that supports the breeching 10, and the latter is provided with rings 11, which are connected by straps 12 with the shaft-engaging rings 4. The shaft-engaging rings 4 are provided with eyes, through which pass the straps 12, which extend back to the breeching.

The catches 5, which are mounted on the shafts or thills 6, near the front ends thereof, comprise an attachment-plate 14, a forwardly-swinging tongue or hook 15, and a spring-actuated bolt 16. The forwardly-swinging tongue or hook 15 is pivoted between a pair of perforated ears and is adapted when released to swing forward and free the rings 4, and thereby disconnect a horse from the vehicle. The spring-actuated bolt 16 is mounted in a suitable housing or casing at the back of the attachment-plate, and it is connected with a releasing cord or strap 17, which extends along the thills through guide-eyes 18 and around the dashboard of a vehicle in order to be within easy reach of the occupants thereof, so that the bolts may be readily withdrawn from engagement with the tongues of the catches.

The shafts or thills are provided at points between their ends with forwardly-extending hooks 19, adapted to receive rings 20 of supplemental holdback-straps 21, the straps 12 constituting the main holdback-straps and enabling a horse to back a vehicle and to obtain the necessary holdback action. The supplemental holdback-straps automatically disengage their rings from the forwardly-extending hooks 19 when the catches are released, and they are designed especially for use on thills which have become worn and which might be broken were the strain exerted in backing applied to them as far forward as the catches.

The guiding reins or lines 22, which pass through the guide-rings 2ª, are supported by short straps or connections 23, extending downward from the top of the harness at opposite sides thereof and provided with guide-rings 24, through which the reins or lines 22 pass. By supporting the lines or reins in this manner they are prevented from accidentally catching in the devices of the shafts or thills when the horse is released.

The invention has the following advantages: The horse-detacher, which is exceedingly simple and inexpensive in construction, greatly simplifies and lessens the cost of harness and enables a horse to be readily disconnected from a vehicle should it attempt to run away, thereby preventing the vehicle or its occupants from being injured. The arms, which are formed integral with the hames, are adapted to support a pair of thills without employing a back-band or a saddle. The supplemental holdback-straps 21, which engage the hooks 19, are adapted to relieve the front portion of the shafts of strain and are designed to be employed on weak shafts which might be broken should the strain incident to backing be applied as far front as the catches 5.

Changes in the form, proportion, and minor details of construction may be resorted to without departing from the spirit or sacrificing any of the advantages of this invention.

What I claim is—

1. In a device of the class described, the combination with catches designed to be mounted on a pair of thills, of a harness having hames provided with rigid rearwardly-extending arms detachably connected with the catches and supporting the thills, and holdback-straps extending from the breeching to the said arms, substantially as described.

2. In a device of the class described, the combination with a pair of catches designed to be mounted on a pair of thills, of a pair of hames provided between their ends with rigid rearwardly-extending arms adapted to support the thills, rings depending from the arms, engaging the catches and provided with eyes, a breeching, and holdback-straps extending from the breeching to the rings and passing through the eyes thereof, substantially as described.

In testimony that I claim the foregoing as my own I have hereto affixed my signature in the presence of two witnesses.

JOHN REEL.

Witnesses:
 JNO. J. FAIR,
 L. G. BRYAN.